United States Patent
Tam et al.

(10) Patent No.: US 8,792,200 B1
(45) Date of Patent: Jul. 29, 2014

(54) DISK DRIVE EMPLOYING A TEMPERATURE DEPENDENT WRITE OFFSET

(71) Applicant: Western Digital Technologies, Inc., Irvine, CA (US)

(72) Inventors: Zong Yuan Tam, Seri Kembangan (MY); Chek Seng Ching, Setapak (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/034,514

(22) Filed: Sep. 23, 2013

(51) Int. Cl.
*G11B 5/02* (2006.01)
*G11B 21/02* (2006.01)

(52) U.S. Cl.
USPC .............................. 360/55; 360/76

(58) Field of Classification Search
None
See application file for complete search history.

(56) References Cited

U.S. PATENT DOCUMENTS

| | | | |
|---|---|---|---|
| 5,109,306 A | 4/1992 | Mase et al. | |
| 5,321,564 A * | 6/1994 | Takahashi et al. | 360/77.04 |
| 5,500,776 A | 3/1996 | Smith | |
| 5,949,602 A | 9/1999 | Ishioka et al. | |
| 6,008,962 A | 12/1999 | Le et al. | |
| 6,025,969 A | 2/2000 | Ishioka et al. | |
| 6,061,201 A | 5/2000 | Woods | |
| 6,078,454 A * | 6/2000 | Takahashi et al. | 360/66 |
| 6,421,197 B1 | 7/2002 | Abdelnour | |
| 6,476,992 B1 | 11/2002 | Shimatani | |
| 6,510,017 B1 | 1/2003 | Abdelnour | |
| 6,594,106 B1 * | 7/2003 | Serrano et al. | 360/78.09 |
| 6,631,046 B2 | 10/2003 | Szita et al. | |
| 6,650,491 B2 | 11/2003 | Suzuki et al. | |
| 6,687,078 B1 | 2/2004 | Kim | |
| 6,754,030 B2 | 6/2004 | Seng et al. | |
| 7,193,809 B1 | 3/2007 | Allen | |
| 7,265,930 B2 | 9/2007 | Nakamura et al. | |
| 7,271,977 B1 | 9/2007 | Melrose et al. | |
| 7,460,328 B2 | 12/2008 | Chase et al. | |
| 7,583,470 B1 | 9/2009 | Chen et al. | |
| 8,000,053 B1 | 8/2011 | Anderson | |
| 2005/0129090 A1 * | 6/2005 | Sheperek et al. | 374/185 |
| 2005/0213250 A1 * | 9/2005 | Kurita et al. | 360/234.4 |
| 2007/0188907 A1 * | 8/2007 | Satoh et al. | 360/31 |
| 2008/0198497 A1 * | 8/2008 | Lee et al. | 360/59 |
| 2009/0161248 A1 * | 6/2009 | Sudo | 360/77.04 |
| 2009/0213486 A1 * | 8/2009 | Takahashi | 360/75 |
| 2012/0002314 A1 | 1/2012 | Huang et al. | |

FOREIGN PATENT DOCUMENTS

JP    2005141874 A  *  6/2005

* cited by examiner

*Primary Examiner* — Thang Tran (57) ABSTRACT

A disk drive is disclosed comprising a disk, and a head actuated over the disk, the head comprising a read element radially offset from a write element. A temperature is measured, and an operating write offset is generated based on the measured temperature. Data is written to a target radial location on the disk by radially offsetting the write element based on the operating write offset. An operating read offset is generated based on the target radial location on the disk, and the data is read from the disk by radially offsetting the read element based on the operating read offset.

18 Claims, 6 Drawing Sheets

| TEMP | OFFSET |
|---|---|
| T1 | OFF1 |
| T2 | OFF2 |
| T3 | OFF3 |
| T4 | OFF4 |
| . | . |
| TN | OFFN |

FIG. 5A

RADIAL LOC1

| TEMP | OFFSET |
|---|---|
| T1 | OFF1 |
| T2 | OFF2 |
| T3 | OFF3 |
| T4 | OFF4 |
| . | . |
| TN | OFFN |

RADIAL LOC2

| TEMP | OFFSET |
|---|---|
| T1 | OFF1 |
| T2 | OFF2 |
| T3 | OFF3 |
| T4 | OFF4 |
| . | . |
| TN | OFFN |

. . .

RADIAL LOCN

| TEMP | OFFSET |
|---|---|
| T1 | OFF1 |
| T2 | OFF2 |
| T3 | OFF3 |
| T4 | OFF4 |
| . | . |
| TN | OFFN |

DISK DRIVE EMPLOYING A TEMPERATURE DEPENDENT WRITE OFFSET

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
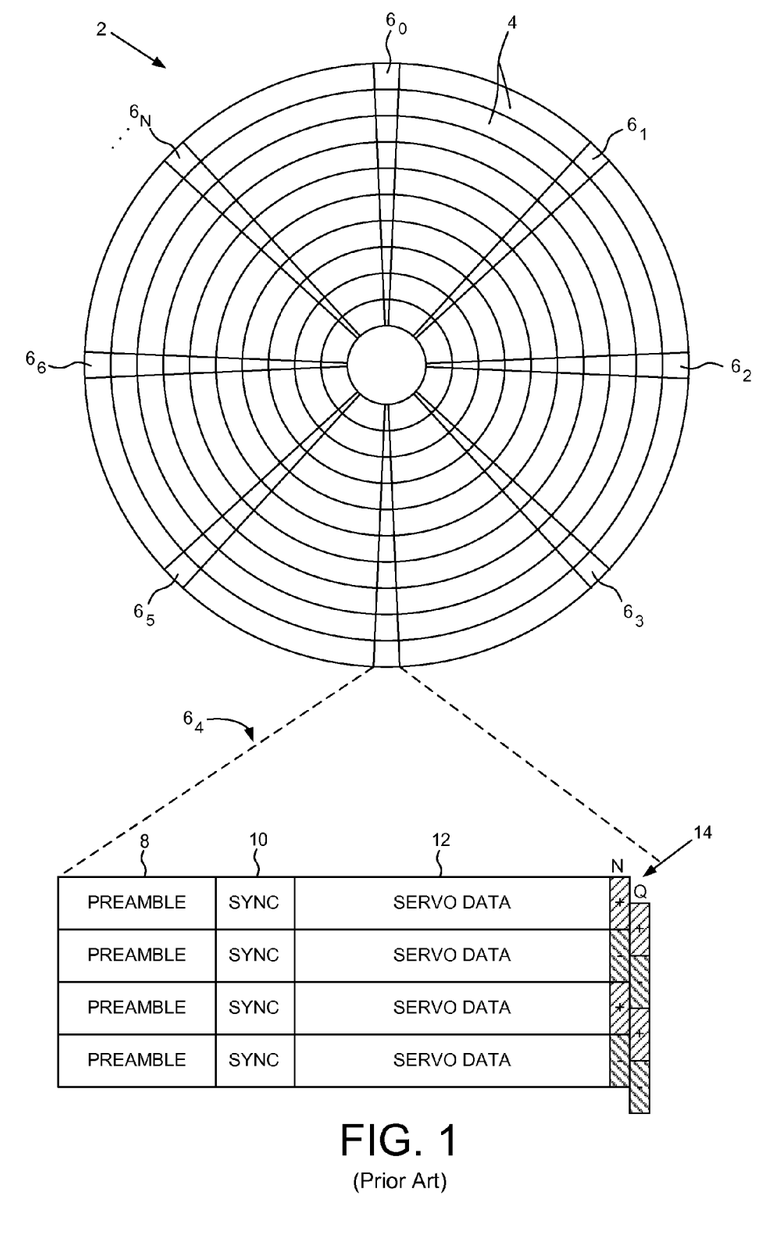
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
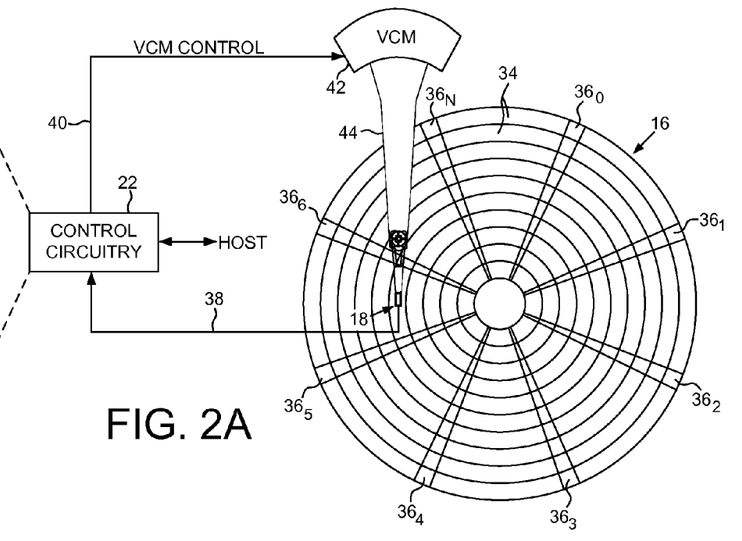
FIG. 2A shows a disk drive according to an embodiment comprising a head actuated over a disk.

FIG. 2A shows a disk drive according to an embodiment comprising a disk 16, and a head 18 (FIG. 2B) actuated over the disk 16, the head 18 comprising a read element 20A radially offset from a write element 20B. The disk drive further comprises control circuitry 22 configured to execute the flow diagram of FIG. 2C, wherein a temperature is measured (block 24), and an operating write offset is generated based on the measured temperature (block 26). Data is written to a target radial location on the disk by radially offsetting the write element based on the operating write offset (block 28). An operating read offset is generated based on the target radial location on the disk (block 30), and the data is read from the disk by radially offsetting the read element based on the operating read offset (block 32).

In the embodiment of FIG. 2A, the disk 16 comprises a plurality of servo tracks 34 defined by servo sectors $36_0$-$36_N$, wherein data tracks are defined relative to the servo tracks at the same or different radial density. The control circuitry 22 processes a read signal 38 emanating from the head 18 to demodulate the servo sectors $36_0$-$36_N$ and generate a position error signal (PES) representing an error between the actual position of the head and a target position relative to a target track. The control circuitry 22 filters the PES using a suitable compensation filter to generate a control signal 40 applied to a voice coil motor (VCM) 42 which rotates an actuator arm 44 about a pivot in order to actuate the head 18 radially over the disk 16 in a direction that reduces the PES. The servo sectors $36_0$-$36_N$ may comprise any suitable head position information, such as a track address for coarse positioning and servo bursts for fine positioning. The servo bursts may comprise any suitable pattern, such as an amplitude based servo pattern or a phase based servo pattern.

Figure 2B:
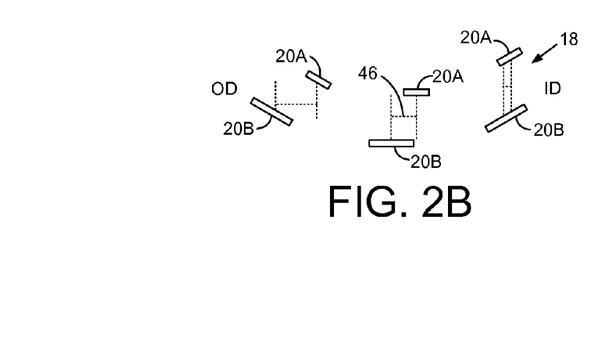
FIG. 2B shows a head according to an embodiment comprising a read element radially offset from a write element.
Figure 3A:
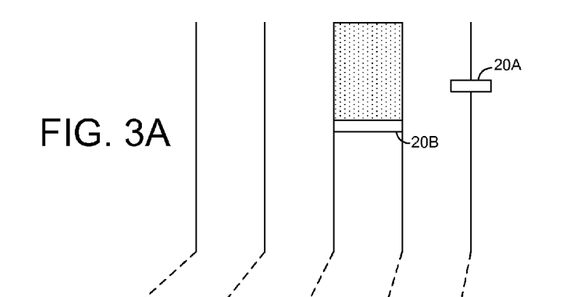
FIG. 3A illustrates a write operation wherein the data is written offset from the radial location of the read element.

Referring again to FIG. 2B, the radial offset 46 between the read element 20A and the write element 20B may be accounted for by employing an operating read offset (jog value) during a read operation. That is during a write operation as illustrated in FIG. 3A, the read element 20A may be positioned over the disk 16 at a target radial location established by processing the servo sectors $36_0$-$36_N$ wherein the write element 20B writes data at a radial offset 46 (FIG. 2B) from the read element 20A. When reading the data, the read element 20A is offset from the target radial location by a corresponding operating read offset so that the read element 20A is essentially centered over the written data. FIG. 2B illustrates that the radial offset 46 between the read element 20A and the write element 20B may vary based on the radial location of the head 18 due to the skew angle of the head 18. Accordingly, the operating read offset may be adjusted based on the radial location of the head 18 to account for the change in the radial offset 46 between the read element 20A and write element 20B (e.g., by indexing a read jog table with the radial location of a read operation).

Figure 3B:
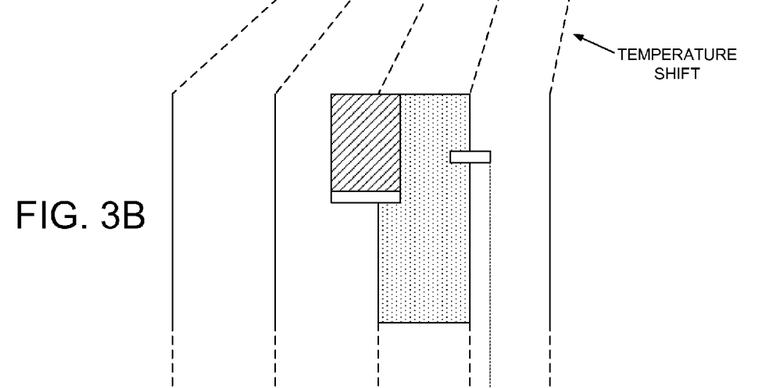
FIG. 3B illustrates how a shift of the data tracks due to a change in temperature may cause previously written data tracks to be overwritten.
Figure 3C:
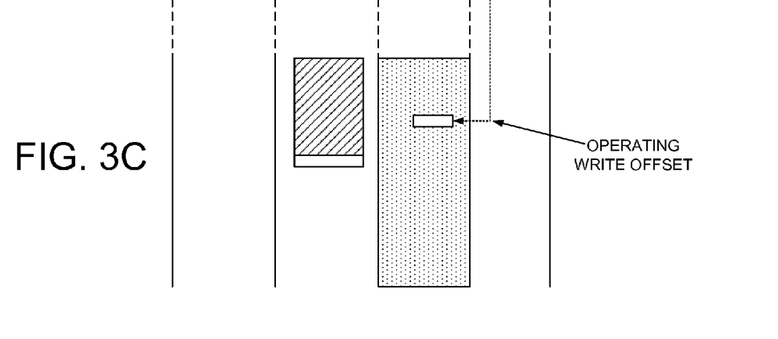
FIG. 3C illustrates an embodiment wherein an operating write offset is generated based on the measured temperature during a write operation in order to avoid overwriting previously written data tracks.

When the temperature increases it may cause a thermal deformation (e.g., expansion) of a component of the disk drive, such as a thermal deformation of the disk and/or the head stack assembly. For example, if a temperature increase causes the disk 16 to expand, there is a corresponding expansion (and shift) outward of all of the data tracks as illustrated in FIG. 3B. If this shift in the data tracks is not accounted for, then data in a previously written data track may be overwritten as illustrated in FIG. 3B. Accordingly in one embodiment, prior to writing data to the disk the temperature is measured and an operating write offset is generated based on the measured temperature. The operating write offset is then used to shift the read element 20A (and the write element 20B) so that the data in a previously written data track is not overwritten as illustrated in FIG. 3C.

Figure 4A:
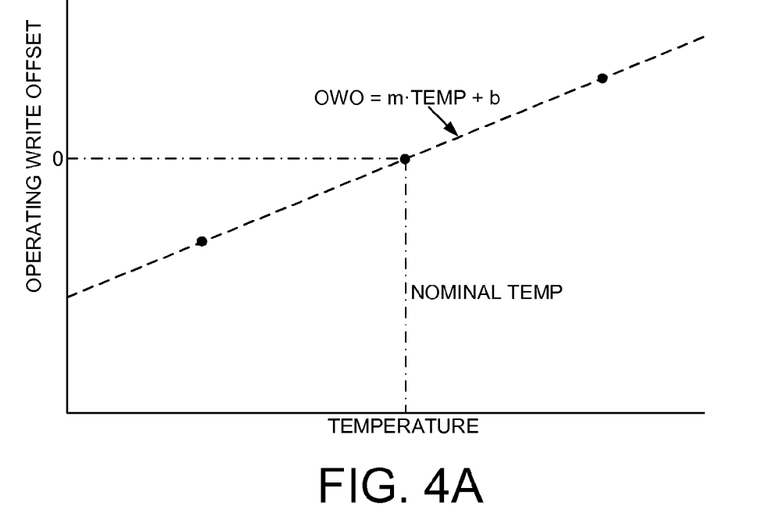
FIG. 4A illustrates an embodiment wherein an operating write offset may be generated corresponding to at least two different temperatures so as to generate the remaining operating write offsets as a function of the measured temperature.

In one embodiment, the appropriate operating write offset may be determined during a manufacturing procedure wherein the disk drive may be evaluated under different operating temperatures. FIG. 4A shows an example wherein at a nominal operating temperature the operating write offset may be zero such that the write offset during a write operation is based on the radial offset 46 between the read element 20A and the write element 20B as shown in FIG. 2B. As the temperature changes, there is an effective change in the radial offset 46 due, for example, to the disk 16 expanding as shown in FIG. 3B. This change in the effective radial offset 46 may be measured in any suitable manner, such as by writing a test pattern while servoing the read element 20A over a target radial location, and then locating the center of the written test pattern by scanning the read element 20A over the test pattern and evaluating the resulting read signal.

Figure 5A:
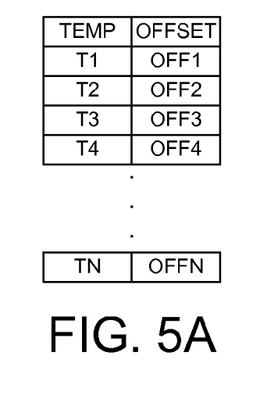
FIG. 5A illustrates an embodiment wherein a write jog table is generated based on the temperature function.

In one embodiment, the change in the effective radial offset 46 may be measured for at least two different operating temperatures, and then a function may be estimated by curve fitting the resulting data points. In the example of FIG. 4A, the operating write offset may be measured for two different operating temperatures, and then a linear function (slope and offset) estimated for generating the remaining operating write offsets (OWO) as a function of the temperature. Other embodiments may measure more than two data points, as well as generate the function based on a more complex polynomial. Once the function has been generated, it may be used during normal operation of the disk drive in order to generate the operating write offset on-the-fly based on the measured temperature, or in another embodiment shown in FIG. 5A, the function may be used to generate a write jog table comprising the operating write offsets that correspond to a number of different temperatures. The write jog table may then be indexed during normal operation by the measured temperature in order to generate the operating write offset. In one embodiment, the function (or optionally a write jog table) may be generated for each production disk drive by evaluating the effective change in the radial offset 46 with respect to the change in temperature. In another embodiment, a subset of disk drives may be evaluated in order to generate a nominal function (or optionally a nominal write jog table) that may be loaded into each production disk drive.

Figure 4B:
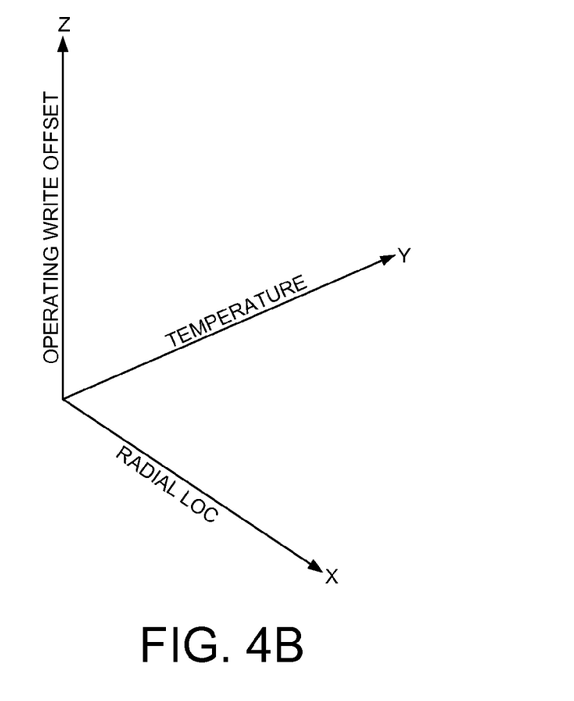
FIG. 4B illustrates an embodiment wherein the operating write offset may be generated as a function of the measured temperature and the radial location of the head.
Figure 5B:
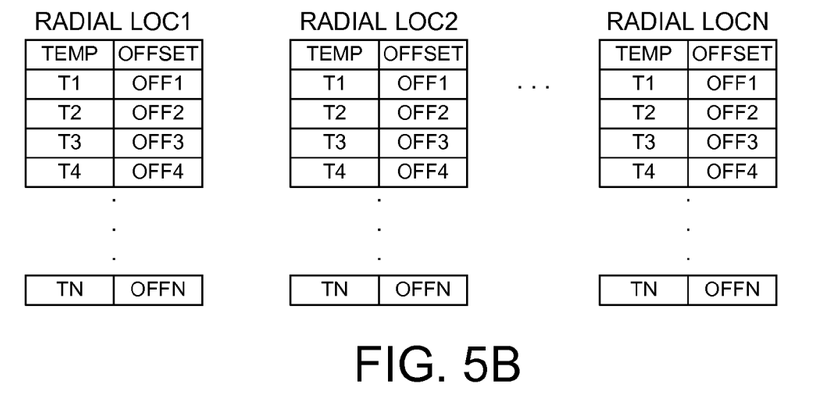
FIG. 5B illustrates an embodiment wherein a plurality of write jog tables are generated based on the temperature function, wherein each write jog table corresponds to a different radial location of the head.

In one embodiment, the effective change in the radial offset 46 due to a change in temperature may vary based on the radial location of the head. Accordingly, in one embodiment the effective change in the radial offset 46 may be measured over a number of different temperatures as well as over a number of different radial locations as illustrated in FIG. 4B. A two-dimensional function or write jog table may then be generated based on the measured data points. During normal operation, the operating write offset may then be generated based on both the measured temperature as well as the radial location of the head for the write operation. FIG. 5B illustrates an example of this embodiment wherein a plurality of write jog tables are generated corresponding to a number of different radial locations, wherein each write jog table stores the operating write offset for a number of different temperatures. In one embodiment, the operating write offset may be generated by interpolating between the values stored in the write jog table of either FIG. 5A or FIG. 5B. That is, if the target radial location is between the radial locations shown in FIG. 5B, and/or if the measured temperature is between a temperature shown in FIG. 5A or FIG. 5B, the operating write offset may be generated by interpolating between the nearest values within the tables (and across the tables of FIG. 5B).

In one embodiment, the shift in the data tracks due to a thermal deformation does not affect a read operation since the head 18 is servoed over the disk 16 relative to the read element 20A. For example, when the disk 16 expands as shown in FIG. 3B, there is a corresponding expansion of the servo tracks which means the read element 20A will automatically follow the shift in the data tracks. Accordingly, in this embodiment the control circuitry 22 may position the read element 20A over the target data track based on the radial offset 46 between the read element 20A and the write element 20B at the target radial location as shown in FIG. 2B, without compensating for thermal deformation due to a change in temperature. In one embodiment, the operating read offset may be adjusted during retry operations in order to account for errors during the write operation, for example, due to an inaccurate compensation of thermal deformation during the write operation.

Figure 2C:
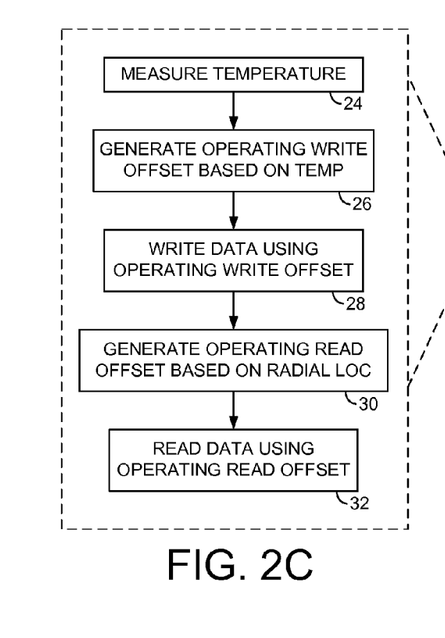
FIG. 2C is a flow diagram according to an embodiment wherein an operating write offset is generated based on a measured temperature, and an operating read offset is generated based on a radial location of the head.
Figure 6:
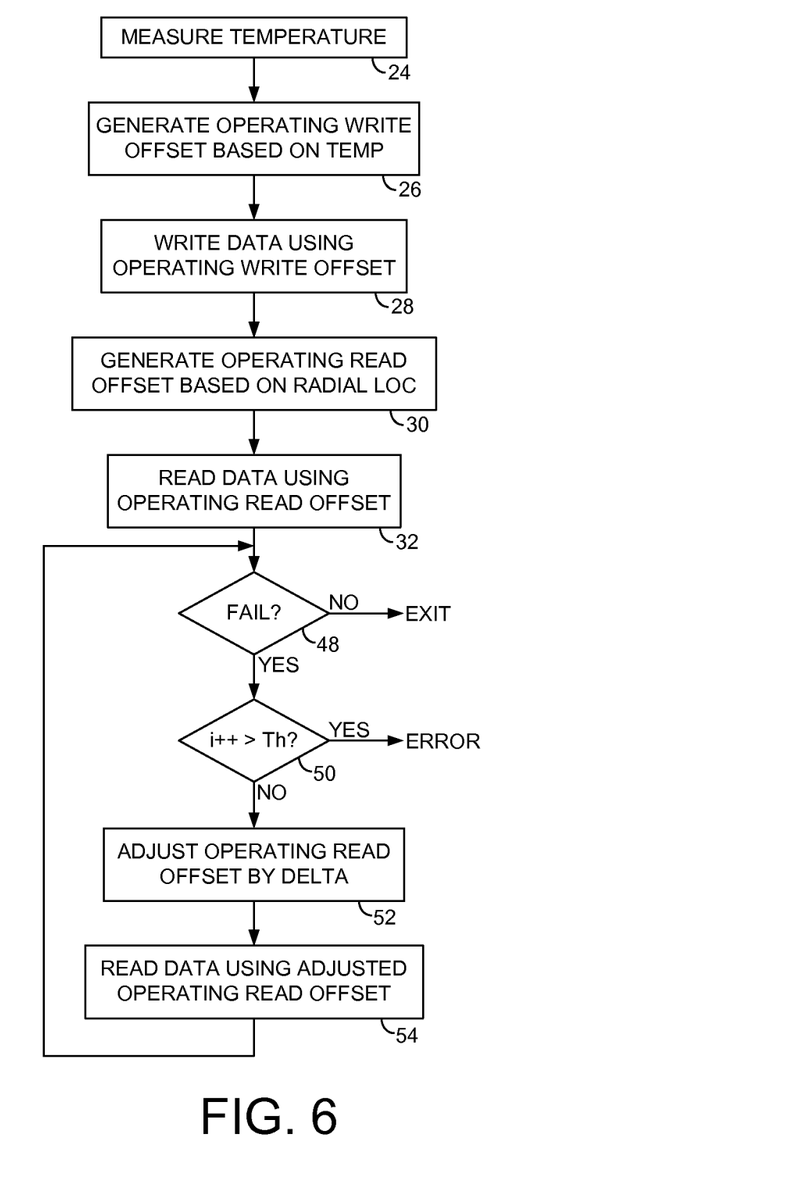
FIG. 6 is a flow diagram according to an embodiment wherein the operating write offset is used during a write operation, and when a corresponding read operation fails, the operating read offset is adjusted during retry operations.

This embodiment is understood with reference to the flow diagram of FIG. 6 which is an extension of the flow diagram of FIG. 2C, wherein an initial read operation first attempts to read data from a target data track (block 32) using an operating read offset that is based on the radial location of the head (FIG. 2B). If the read operation fails (block 48), and a number of retry operations has not exceed a threshold (block 50), then the operating read offset is adjusted by a delta (block 52) and the target data track is read again using the adjusted operating read offset (block 54). This process is repeated using different values for the delta at block 52 until the read operation is successful, or until a maximum number of retries is reached at block 50. In this manner, when the operating write offset used to write the data is not completely accurate (or there are other write errors), a corresponding delta at block 52 may help align the read element close enough to the center of the written data so as to successfully recover the data.

The above-described radial offsets may take on any suitable polarity which may be determined from the geometry of the head 18 and/or the particular implementation details of the figures. For example, in FIG. 2B the radial offset 46 between the read element 20A and the write element 20B is illustrated with a particular orientation and with a constant polarity across the radius of the disk. In other embodiments, the orientation of the radial offset 46 may be reversed such that the read element 20A leads the write element 20B toward the outer diameter of the disk 16. In other embodiments, the radial offset 46 may become zero at a particular radial location (e.g., middle diameter) and therefore exhibit a first polarity toward the outer diameter and the opposite polarity toward the inner diameter. In addition, the polarity of the operating write offset as a function of the measured temperature may take on any suitable polarity. In the example of FIG. 4A, the operating write offset may be positive or negative relative to a nominal temperature; however, in other embodiments the operating write offset may be only one polarity (e.g., if the nominal temperature shown in FIG. 4A corresponds to a minimum or maximum).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being configured to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:
1. A disk drive comprising:
a disk;
a head actuated over the disk, the head comprising a read element radially offset from a write element; and
control circuitry configured to:
measure a temperature;
generate an operating write offset based on the measured temperature;
write data to a target radial location on the disk by radially offsetting the write element based on the operating write offset;
generate an operating read offset based on the target radial location on the disk; and
read the data from the disk by radially offsetting the read element based on the operating read offset.

2. The disk drive as recited in claim 1, wherein the control circuitry is further configured to generate the operating write offset as a function of the temperature.

3. The disk drive as recited in claim 2, wherein the control circuitry is further configured to:
measure a first temperature write offset at a first temperature;
measure a second temperature write offset at a second temperature; and
generate the function based on the first temperature write offset and second temperature write offset.

4. The disk drive as recited in claim 3, wherein the control circuitry is further configured to generate a write jog table using the function.

5. The disk drive as recited in claim 1, wherein the control circuitry is further configured to generate the operating write offset based on the target radial location.

6. The disk drive as recited in claim 1, wherein when reading data from the disk using the operating read offset fails, the control circuitry is further configured to retry the read after adjusting the operating read offset by a delta.

7. The disk drive as recited in claim 1, wherein the operating write offset compensates for a thermal deformation of a component of the disk drive.

8. The disk drive as recited in claim 7, wherein the component comprises the disk.

9. The disk drive as recited in claim 7, wherein the component comprises a head stack assembly.

10. A method of operating a disk drive comprising:
measuring a temperature;
generating an operating write offset based on the measured temperature;
writing data to a target radial location on a disk by radially offsetting a write element based on the operating write offset;
generating an operating read offset based on the target radial location on the disk; and
reading the data from the disk by radially offsetting the read element based on the operating read offset.

11. The method as recited in claim 10, further comprising generating the operating write offset as a function of the temperature.

12. The method as recited in claim 11, further comprising:
measuring a first temperature write offset at a first temperature;
measuring a second temperature write offset at a second temperature; and
generating the function based on the first temperature write offset and second temperature write offset.

13. The method as recited in claim 12, further comprising generating a write jog table using the function.

14. The method as recited in claim 10, further comprising generating the operating write offset based on the target radial location.

15. The method as recited in claim 10, wherein when reading data from the disk using the operating read offset fails, the method further comprises retrying the read after adjusting the operating read offset by a delta.

16. The method as recited in claim 10, wherein the operating write offset compensates for a thermal deformation of a component of the disk drive.

17. The method as recited in claim 16, wherein the component comprises the disk.

18. The method as recited in claim 16, wherein the component comprises a head stack assembly.

* * * * *